United States Patent [19]

DeRoo

[11] 3,996,193
[45] Dec. 7, 1976

[54] ANTIOXIDANTS

[75] Inventor: Anthony M. DeRoo, Midland, Mich.

[73] Assignee: The Dow Chemical Company, Midland, Mich.

[22] Filed: Aug. 21, 1968

[21] Appl. No.: 754,463

[52] U.S. Cl. .............. 260/45.9 R; 260/45.9 QB; 260/45.9 K; 260/798; 260/801
[51] Int. Cl.² ........................................ C08K 5/17
[58] Field of Search .............. 260/45.9, 798, 892, 260/801

[56] References Cited
UNITED STATES PATENTS

| 2,382,702 | 8/1945 | Howland | 260/45.9 |
| 2,697,700 | 12/1954 | Uraneck et al. | 260/45.9 |
| 2,729,691 | 1/1956 | Depree | 260/45.9 |
| 2,829,121 | 4/1958 | Leeper | 260/45.9 |
| 3,098,841 | 7/1963 | Morris et al. | 260/45.9 |
| 3,676,394 | 7/1972 | Murray et al. | 260/45.9 |

FOREIGN PATENTS OR APPLICATIONS 545,381  8/1957  Canada ........................... 260/45.9

Primary Examiner—Eugene C. Rzucidlo
Attorney, Agent, or Firm—W. White

[57] ABSTRACT

Polyalkylenepolyamines consisting essentially of repeating units having the formula

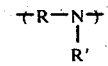

where R is alkylene having up to twelve carbon atoms, of which not more than six carbon atoms are in the polymer backbone chain; and R' is H, alkyl having up to 12 carbon atoms or aralkyl having up to 16 carbon atoms, are antioxidants for hydraulic fluids, elastomers and other organic substances that deteriorate by contact with oxygen.

9 Claims, No Drawings

ANTIOXIDANTS

BACKGROUND OF THE INVENTION

It is well known that oxygen, ozone, heat, light and mechanical treatment contribute to the premature degradation of many organic substances. Of these contributing factors, oxygen and ozone are the major causes of degradation.

The present invention is primarily concerned with minimizing the oxidation of certain organic substances by oxygen. Many compounds have been used to prevent oxidation, and as a broad class, these compounds are referred to as antioxidants.

Typical of the antioxidants commercially used in a specific class of elastomers, e.g. rubber, are the secondary diarylamines (such as the phenyl napthylamines, the substituted diphenylamines and substituted p-phenylenediamines) and the secondary alkarylamines. See Buist, *Aging and Weathering of Rubber*, 121 (W. Heffer & Sons Ltd. 1956). In general, by adding an antioxidant, some sacrifice is made with respect to the aged and unaged physical properties of rubbers.

SUMMARY OF THE INVENTION

It has now been found that a specific class of polyalkylenepolyamines are unusually good antioxidants for certain types of organic substances that are subject to degradation by the action of oxygen. In addition, in specific classes of these substances, the polyalkylenepolyamines hereinafter described impart other useful and desirable properties to the substances treated.

In order to practice the invention, the polyalkylenepolyamine is simply added to the substance to be treated in the usual manner for antioxidants. Since all the substances hereinafter described are well known in the art to be subject to degradation by oxygen, the normal practice is to include an antioxidant at some point during their manufacture. These points of incorporation and the methods of adding the antioxidant are well known to those skilled in the art.

The compounds that are useful antioxidants in this invention are the polyalkylenepolyamines consisting essentially of repeating units having the formula

where each R independently is alkylene having up to twelve carbon atoms (preferably having up to six carbon atoms) of which not more than 6 carbon atoms (preferably not more than 4 carbon atoms) are in the polymer backbone chain; and each R' independently is H, alkyl having up to 12 carbon atoms (preferably not more than 6 carbon atoms) or aralkyl having up to 16 carbon atoms (preferably having up to 10 carbon atoms).

The term alkylene is meant to denote divalent saturated aliphatic hydrocarbon radicals wherein the two valences are attached to different carbon atoms. Thus, specific examples of R include ethylene, 1,3-propylene (i.e., trimethylene), 1,4-butylene (i.e., tetramethylene) 1,5-pentylene (i.e., pentamethylene), 1,6-hexylene (i.e., hexamethylene) and alkyl substituted ethylene, 1,3-propylene, 1,4-butylene, 1,5-pentylene and 1,6-hexylene; e.g. 1,2-propylene, 1,2-butylene, 1,2-pentylene, 1,2-heptylene, 1,2-octylene, 1,2-dodecylene, 1,3-butylene, 1,3-pentylene, 1,3-octylene, 1,3-dodecylene, 1,4-pentylene, 1,4-hexylene, 1,4-octylene, 1,4-dodecylene, 1,5-hexylene, 1-5, heptylene, 1,5-octylene, 1,5-decylene, 1,5-dodecylene, 1,6-heptylene, 1,6-octylene, 1,6-decylene, 1,6-dodecylene, 2,3-butylene, 2,3-pentylene, 2,3-hexylene, 2,3-octylene, 2,3-dodecylene, 2,4-pentylene, 2,4-hexylene, 2,4-heptylene, 2,4-nonylene, 2,4-dodecylene, 2,5-hexylene, 2,5-heptylene, 2,5-decylene, 2,5-dodecylene, 2,6-heptylene, 2,6-octylene, 2,6-decylene, 2,6-dodecylene, 2,7-octylene, 2,7-nonylene, 2,7-dodecylene, 3,4-hexylene, 3,4-heptylene, 3,4-nonylene, 3,4-dodecylene, 3,5-heptylene, 3,5-octylene, 3,5-dodecylene, 3,6-octylene, 3,6-nonylene, 3,6-decylene, 3,6-dodecylene, 3,7-nonylene, 3,7-decylene, 3,7-dodecylene, 3,8-decylene, 3,8-dodecylene, 4,5-octylene, 4,5-nonylene, 4,5-decylene, 4,5-dodecylene, 4,6-nonylene, 4,6-undecylene, 4,6-dodecylene, 4,7-decylene, 4,7-dodecylene, 4,8-undecylene, 4,8-dodecylene, 4,9-dodecylene, 5,6-decylene, 5,6-dodecylene, 5,7-undecylene, 5,7-dodecylene, 5,8-dodecylene, and 6,7-dodecylene.

As was previously indicated, R' can be alkyl having up to 12 carbon atoms. Specific examples of R' include methyl, ethyl, n-propyl, isopropyl, n-butyl, sec-butyl, isobutyl, n-pentyl and the other isomeric pentyl groups having the formula $C_5H_{11}$, n-hexyl and the other isomeric hexyl groups having the formula $C_6H_{13}$, n-heptyl and the other isomeric heptyl groups having the formula $C_7H_{15}$, n-octyl and the other isomeric octyl groups having the formula $C_8H_{17}$, n-nonyl and the other isomeric nonyl groups having the formula $C_9H_{19}$, n-decyl and the other isomeric decyl groups having the formula $C_{10}H_{21}$, n-undecyl and the other isomeric undecyl groups having the formula $C_{11}H_{23}$, and n-dodecyl and the other isomeric dodecyl groups having the formula $C_{12}H_{25}$. Of course, the alkyl groups can be substituted, e.g. with hydroxyl or cyano groups. Specific examples of these types of groups are hydroxyethyl and cyanoethyl.

R' can also be aralkyl having up to sixteen carbon atoms. Preferred aralkyl groups are benzyl, phenethyl, 1-naphthylmethyl, 2-naphthylmethyl, 2-(2-naphthyl)ethyl and 2-(1-naphthyl)ethyl. Of course, the aryl moiety of the aralkyl groups can contain substituents, e.g. halo (preferably chloro or bromo), hydroxyl or alkyl having up to eight carbon atoms. Specific alkyl groups that can be used for aralkyl substitution are listed under the definition of R', above. Thus, specific substituted aralkyl groups include the ortho, meta and para alkyl-substituted benzyl and phenethyl groups, e.g. m-t-butylphenethyl, p-t-butylphenethyl, p-octylphenethyl, m-methylphenethyl, o-n-butylphenethyl, p-n-heptylbenzyl, m-n-hexylbenzyl, o-n-pentylbenzyl, p-propylphenethyl and o-ethylphenethyl. The alkyl-substituted naphthylmethyl and naphthylethyl groups include 2-(1-(4-n-butyl)naphthyl) ethyl, 2-(2-(3-ethyl) naphthyl)ethyl, 5-methylnaphthylmethyl and 6-n-pentylnaphthylmethyl. Also included are the hydroxyl- and halo-substituted aralkyls, e.g. p-hydroxyphenethyl, m-hydroxybenzyl, o-hydroxyphenethyl, o-chlorophenethyl, p-bromophenethyl, m-iodobenzyl, p-fluorobenzyl, 2-(3-chloro)naphthylmethyl, 1-(7-bromo)-naphthylmethyl, and 1-(2-(8-chloro)naphthyl)ethyl. Also included within the term aralkyl are the 2-alkyl-substituted phenethyl radicals, e.g. 2-methylphenethyl, 2-ethylphenethyl and the like.

Preferred R' groups are those with at least one and preferably two hydrogens attached to the carbon adjacent to the nitrogen in the backbone of the polymer. Of course, the R' groups can be the same at each nitrogen in the backbone or can vary from backbone nitrogen to backbone nitrogen, e.g. 50% of the R' groups can be phenethyl with the other 50% being hydrogen. Just as the R' groups can vary within the same molecule, the R groups can also vary, e.g. 50% of the R groups can be ethylene and 50% of the R groups can be 1,2-propylene within the same molecule.

The molecular weight range of the polyalkylenepolyamines of the invention can vary widely, e.g. the average molecular weights, as determined by well-known light scattering techniques, can vary from about 100 to about 1,000,000. For example, triethylene tetramine and its substituted forms are included within this range, e.g. hexaphenethyl triethylene tetramine, as are the higher molecular weight polyalkylenepolyamines. Preferable average molecular weights are from about 300 to about 200,000 and most preferably between 600 and 100,000.

The antioxidants of the present invention are made by a number of processes. For example, the reaction of an aziridine and a styrene in the presence of an alkali metal produces a phenethylaziridine monomer which is then polymerized by heating in the presence of an acid catalyst, e.g. sulfuric acid. The preparation of such monomers is more fully described by Bestian in U.S. Pat. No. 2,654,737, the disclosure of which is hereby incorporated by reference. This method, of course, is useful in preparation of the phenethylaziridine and alkyl-substituted phenethylaziridine copolymers from styrene and alkyl-substituted or halo-substituted styrenes. The molecular weight of these polymers can be controlled by the addition of a primary or secondary amine, e.g. ethylenediamine, as is more fully set out in the U.S. patent application by Schneider et al. entitled "Controlled Molecular Weight Aziridine Polymers," Ser. No. 558,555, filed June 20, 1966, the disclosure of which is hereby incorporated by reference.

Another method of preparation is to react an aralkyl halide, e.g. benzyl bromide or phenethyl chloride, with a polyalkylenepolyamine of the desired molecular weight. The polyamine can be polyethylenimine or other polyalkylenimine, e.g. a polymer prepared from an ethylenediamine, 1,3-propylenediamine, 1,4-n-butylenediamine or higher polyalkylenepolyamine and an alkylene dialkylating agent, e.g. an alkylene dihalide such as ethylene dichloride. Similarly, instead of an aralkyl halide, an alkyl halide or substituted alkyl halide, e.g. n-dodecyl chloride, ethylenechlorohydrin or B-chloropropionitrile can be employed. Of course, an alternative method is to alkylate or aralkylate an aziridine monomer (or an alkylene diamine, such as 1,4-n-butylenediamine) and then make the polyalkylenepolyamines of the present invention by polymerizing the substituted monomers in the normal fashion.

The substances into which the above-described antioxidants are incorporated are those organic substances that are subject to premature degradation by oxygen. Included is the class of compounds known broadly as elastomers. The term elastomers is used to mean the class of synthetic polymers that have rubberlike characteristics. Typically, such polymers are synthetic diolefin rubbers. Also included within the term is natural rubber, which can be referred to as natural elastomer. Typical of the synthetic elastomers are the styrene-butadiene, polybutadiene, polyisoprene and nitrile rubbers.

In addition to being useful as an antioxidant in elastomers, the polyalkylenepolyamines of the invention are useful in elastomer production as accelerators for vulcanization. Typical elastomers whose vulcanization is accelerated by these polyalkylenepolyamines include natural rubber, styrene-butadiene and polyisoprene. Certain elastomers, e.g. styrene-butadiene, have increased lubricity upon the addition of a polyalkylenepolyamine of the present invention. These antioxidants are, in general, non-coloring and do not promote or cause migration staining.

Of particular importance is the antioxidizing effect of the polyalkylenepolyamines of the present invention on the compounds known as polyoxyalkylene compounds and their derivatives. These compounds and other well-known compounds are widely used as hydraulic fluids (e.g. brake, clutch, transmission, steering, and central system fluids), antifreeze formulations, heat transfer fluids, turbine lubricants and crankcase lubricant additives. Typical of the polyoxyalkylene compounds having the above uses are the polyalkylene glycols, e.g. polyethylene glycol, polypropylene glycol; oxyalkylated castor oil and its derivatives (e.g. castor oil that has been heat treated and/or air blown); the glycol ethers (e.g. those compounds having the formula $R''\text{-}(OR''')_n\text{OH}$ where $R''$ is alkyl having up to 6 carbon atoms, $R'''$ is ethylene or propylene and $n$ is an integer 1 to 6, specifically ethylene glycol phenyl ether, ethylene glycol methyl ether, ethylene glycol ethyl ether, ethylene glycol n-butyl ether, diethylene glycol ethyl ether, diethylene glycol n-butyl ether, propylene glycol methyl ether, dipropylene glycol methyl ether, tripropylene glycol methyl ether and the like), the glycols (e.g. ethylene glycol, propylene glycol, diethylene glycol, triethylene glycol, tetraethylene glycol, dipropylene glycol, and the like) and the simple esters and ether-esters of such glycols, e.g. the monoesters such as the acrylic acid monoester of ethylene glycol, the acetic acid monoester of propylene glycol; the diesters such as butyric acid diester of ethylene glycol, the stearic acid diester of propylene glycol; and the acetic acid ester-ethyl ether of ethylene glycol.

Of course, as is usual in polyoxyalkylene compositions, e.g. hydraulic fluids, the compositions can contain as other additives one or more substances to control pH, prevent corrosion, modify viscosity or control rubber swell, etc. The polyalkylenepolyamines of the present invention also aid in preventing the staining that is associated with many hydraulic fluid compositions. Other additives normally employed in hydraulic fluids are well known in the art and include the borates, the alkanolamines (e.g. monoethanolamine, triethanolamine) and other specific compounds, including piperazine, benzatriazole and the alkali and alkaline earth metal nitrites, nitrates, silicates and phosphates.

The amount of polyalkylenepolyamine added to the organic substance that is subject to oxygen degradation varies according to the protection required and the substance to which it is added. It is preferred to add an amount of the polyalkylenepolyamine sufficient to protect the organic substance from premature degradation. Any of the above-mentioned organic substances have improved resistance to oxygen degradation when they contain an antioxidizing amount of a polyalkylenepolyamine of the present invention. In hydraulic fluids, this amount is typically about 0.01 to 2% of the total fluid composition, by weight, and preferably between about 0.1 and 0.1%. In elastomer protection, the amount added is typically about 0.1 to 3% of the elastomer composition by weight, preferably between about 0.5 and 2% and most preferably less than about 1%. Of course, in order to impart the accelerating and lubricity properties of polyalkylenepolyamines to the elastomers, the amount can be more than is usually used for an antioxidant alone.

DESCRIPTION OF SPECIFIC EMBODIMENT

The polyalkylenepolyamines used in the following examples was made as follows: 1.3 moles of phenethylaziridine was added dropwise over a 1.5 hour period to a mixture of 2.7 g. of p-toluenesulfonic acid monohydrate and 6.3 g. of ethylene diamine. Addition took place at 100° C. under a nitrogen blanket. After addition, the resulting mixture was heated at 100° C. for 3.5 hours and thereafter cooled to room temperature. The resulting product, referred to as poly(1-phenethyl)aziridine (PPEA), was tested as an antioxidant in the following manner: a standard styrene-butadiene rubber (SBR) base composition using a commercially available SBR was formulated according to ASTM D 15-66T. The formulation, which was cured for 30 minutes at 320° F., contained the following ingredients:

| Ingredient | Amount, by weight |
|---|---|
| SBR 1609 | 435.0 |
| Stearic Acid | 3.0 |
| Zinc Oxide | 12.0 |
| Paraffin Waxes | 10.5 |
| Sulfur | 6.0 |
| N-t-butyl-2-benzothiazolesulfenamide | 3.6 |
| Antioxidant | 4.5 |

In Run B (below), PPEA was used as the antioxidant, while in Run A, a widely used commercial antioxidant, 2,2'-methylenebis-(4-methyl-6-t-butyl)phenol, was used as a control. The averaged results of testing unaged physical properties by ASTM D 412-66 were as follows:

UNAGED PHYSICALS

| | UNAGED PHYSICALS | | | |
|---|---|---|---|---|
| | Elongation, % | 300% modulus p.s.i. | Tensile p.s.i. | Hardness |
| Run A | 550 | 1150 | 3530 | 55 |
| Run B (PPEA) | 600 | 1110 | 3750 | 63 |

The results of testing aged physicals and aging after 70 hours at 212° F. using ASTM D 573-53 (1965) were as follows:

AGED PHYSICALS; AIR

| | AGED PHYSICALS; AIR | | | |
|---|---|---|---|---|
| | Elongation, % | 300% modulus p.s.i. | Tensile p.s.i. | Hardness |
| Run A | 340 | 2510 | 2900 | 68 |
| Run B (PPEA) | 430 | 2020 | 3420 | 68 |

The averaged results of testing aged physicals, oxygen bomb aging for 24 hours at 158° F. and 300 p.s.i. using ASTM D 572-67, are as follows:

AGED PHYSICALS; OXYGEN BOMB

| | AGED PHYSICALS; OXYGEN BOMB | | | |
|---|---|---|---|---|
| | Elongation, % | 300% Modulus p.s.i. | Tensile p.s.i. | Hardness |
| Run A | 530 | 1370 | 3280 | 62 |
| Run B (PPEA) | 610 | 1350 | 3770 | 65 |

It will be noted that PPEA has unusually good effects on both aged and unaged tensile, modulus and elongation. A typical antioxidant will result in a decrease in elongation and tensile for unaged rubber stock, while PPEA use demonstrates a marked increase in these properties. Because of the effects on unaged physicals, PPEA was further tested as a processing aid by formulating a standard SBR base containing PPEA and an identical SBR base without PPEA. In comparing the two, the following results were observed using PPEA:

1. Cure time was cut in half at 320° F.,
2. Approximately the same scorch safety was achieved at processing temperatures of 250° F.,
3. Tensile and elongation values were increased 20%, and
4. Viscosity was lowered both at processing and curing temperatures.

In addition to the above tests using a SBR base with PPEA, staining tests pursuant to ASTM D 925-63 showed that PPEA is non-discoloring and does not promote or cause migratory staining. Because of increased use of light-colored rubber products, the antioxidants that are non-staining are in great demand.

Besides elastomer protection and elastomer processing advantages, the polyalkylenepolyamines of the present invention are useful as antioxidants and anticorrosion additives for polyoxyalkylene compounds and their derivatives. For example, PPEA is excellent in stabilizing alkylene oxides, glycols, polyglycols, glycol ethers and their mixtures so that no staining of metals, e.g. brass or copper, results. Specifically, a formulation of diethylene glycol, polyethylene glycol, and various ethylene and propylene glycol ethers stabilized with PPEA did not stain copper or brass.

In addition to PPEA, examples of other antioxidants are given in the Table below:

TABLE

Compounds consisting essentially of repeating units having the formula:

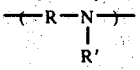

| Compound No. | R | R' | Avg. Mol. Wt. |
|---|---|---|---|
| 1 | ethylene | H | 1,000,000 |

TABLE-continued

Compounds consisting essentially of repeating units having the formula:

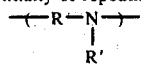

| Compound No. | R | R' | Avg. Mol. Wt. |
|---|---|---|---|
| 2 | " | methyl | 300 |
| 3 | " | n-dodecyl | 4,500 |
| 4 | " | hydroxyethyl | 3,000 |
| 5 | " | n-hexyl | 1,200 |
| 6 | " | cyanoethyl | 2,700 |
| 7 | " | ethyl | 2,500 |
| 8 | " | benzyl | 3,800 |
| 9 | " | 1-naphthylmethyl | 1,500 |
| 10 | " | 2-(1-naphthyl)ethyl | 5,000 |
| 11 | " | p-t-butylphenethyl | 4,000 |
| 12 | " | p-n-octylphenethyl | 100,000 |
| 13 | " | p-methylphenethyl | 90,000 |
| 14 | " | o-ethylphenethyl | 80,000 |
| 15 | " | p-hydroxybenzyl | 70,000 |
| 16 | " | o-hydroxyphenethyl | 60,000 |
| 17 | " | p-chlorophenethyl | 50,000 |
| 18 | " | o-bromobenzyl | 200,000 |
| 19 | " | 2-methylphenethyl | 40,000 |
| 20 | " | 2-ethylphenethyl | 500,000 |
| 21 | 1,2-propylene | H | 200 |
| 22 | " | methyl | 30,000 |
| 23 | " | ethyl | 20,000 |
| 24 | " | n-dodecyl | 10,000 |
| 25 | " | hydroxyethyl | 4,000 |
| 26 | " | n-heptyl | 3,600 |
| 27 | " | cyanoethyl | 3,400 |
| 28 | " | benzyl | 3,800 |
| 29 | " | phenethyl | 3,600 |
| 30 | " | 1-naphthylmethyl | 4,000 |
| 31 | " | 2-(1-naphthyl)ethyl | 6,000 |
| 32 | " | p-t-butylphenethyl | 6,000 |
| 33 | " | p-methylphenethyl | 4,000 |
| 34 | " | p-hydroxyphenethyl | 3,900 |
| 35 | " | p-chlorophenethyl | 5,000 |
| 36 | " | 2-methylphenethyl | 4,500 |
| 37 | 2,3-butylene | ethyl | 3,400 |
| 38 | " | phenethyl | 5,500 |
| 39 | 1,3-propylene | n-dodecyl | 8,000 |
| 40 | 1,4-butylene | H | 2,000 |
| 41 | " | phenethyl | 6,000 |
| 42 | 1,5-pentylene | ethyl | 5,500 |
| 43 | " | phenethyl | 200 |
| 44 | 1,6-hexylene | n-dodecyl | 300 |
| 45 | " | phenethyl | 400 |
| 46 | 2,4-dodecylene | H | 500 |
| 47 | " | phenethyl | 600 |
| 48 | " | n-dodecyl | 700 |
| 49 | 1,3-dodecylene | H | 800 |
| 50 | " | phenethyl | 900 |
| 51 | ethylene | 70% H; 30% phenethyl | 3,000 |
| 52 | " | 50% H; 50% phenethyl | 4,000 |
| 53 | 50% ethylene; 50% 1,2-propylene | phenethyl | 5,000 |
| 54 | 70% ethylene; 30% 1,2-propylene | hydroxyethyl | 2,500 |
| 55 | 50% ethylene; 50% 1,2-propylene | 50% H; 50% phenethyl | 2,800 |

I claim:

1. A composition comprising an admixture of (a) a natural or synthetic diolefin rubber, or a mixture thereof, (b) an anti-oxidizing amount of a polyalkylene-polyamine having a molecular weight of at least 600 and consisting essentially of repeating units of the formula

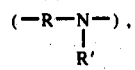

wherein each R independently is alkylene of from 2 to 6 carbon atoms, not more than 4 carbon atoms in R being in the backbone; and each R' independently is hydroxy- or cyano-substituted alkyl having up to 12 carbon atoms or aralkyl or halo-, hydroxyl-, or alkyl-substituted aralkyl having up to 16 carbon atoms.

2. The composition defined in claim 1 wherein R is ethylene or 1,2-propylene.

3. The composition defined in claim 1 wherein R is ethylene.

4. The composition defined in claim 3 wherein R' is 2-hydroxyethyl.

5. The composition defined in claim 3 wherein R' is benzyl or phenethyl.

6. The composition defined in claim 5 wherein R' is phenethyl.

7. The composition defined in claim 3 wherein (a) is a styrene-butadiene rubber, a polybutadiene rubber, a polyisoprene rubber or a nitrile rubber.

8. A composition as defined in claim 1 wherein (a) is a styrene-butadiene rubber, a polybutadiene rubber, a polyisoprene rubber or a nitrile rubber.

9. A composition as defined in claim 1 wherein (a) is a styrene-butadiene rubber.

* * * * *